(12) United States Patent
Noland

(10) Patent No.: US 12,004,437 B1
(45) Date of Patent: Jun. 11, 2024

(54) PORTABLE ROLLER GROOVER ASSEMBLIES

(71) Applicant: Chase Noland, Tallulah, LA (US)

(72) Inventor: Chase Noland, Tallulah, LA (US)

(73) Assignee: Afton Groovers, LLC, Tallulah, LA (US)

( * ) Notice: Subject to any disclaimer, the term of this patent is extended or adjusted under 35 U.S.C. 154(b) by 399 days.

(21) Appl. No.: 17/234,194

(22) Filed: Apr. 19, 2021

(51) Int. Cl.
  *A01B 35/16* (2006.01)
  *A01B 35/28* (2006.01)
  *A01C 5/06* (2006.01)

(52) U.S. Cl.
  CPC .............. *A01B 35/16* (2013.01); *A01B 35/28* (2013.01); *A01C 5/064* (2013.01)

(58) Field of Classification Search
  CPC ......... A01B 29/00; A01B 29/04; A01B 29/06; A01B 29/02; A01B 29/041; A01B 35/16; A01B 35/28; A01B 3/14; A01B 7/00; A01G 20/35; A01C 5/00; A01C 5/04
  USPC ......... 172/21, 551, 624, 540, 603, 548, 537, 172/624.5
  See application file for complete search history.

(56) References Cited

U.S. PATENT DOCUMENTS

| | | | | |
|---|---|---|---|---|
| 1,670,537 A | * | 5/1928 | Guy ........................ | A01B 29/04 172/187 |
| 1,857,753 A | * | 5/1932 | Gausche .............. | A01B 29/041 172/537 |
| 1,939,460 A | * | 12/1933 | Nelson .................... | A01B 29/00 172/581 |
| 2,526,158 A | * | 10/1950 | Renault ................ | A01B 29/041 172/537 |
| 2,635,403 A | * | 4/1953 | Gandrud .............. | A01B 29/041 404/90 |
| 2,833,105 A | | 5/1958 | Naery | |
| 4,569,296 A | | 2/1986 | Miller et al. | |
| 7,197,865 B1 | | 4/2007 | Enns et al. | |
| 8,333,249 B1 | | 12/2012 | Minton et al. | |
| 9,545,049 B2 | | 1/2017 | Barnett et al. | |
| 9,565,800 B2 | | 2/2017 | Fay, II et al. | |
| 2015/0096774 A1 | * | 4/2015 | Edwards ................ | A01B 29/04 172/747 |
| 2021/0308976 A1 | * | 10/2021 | Kraus ..................... | B30B 9/306 |

\* cited by examiner

*Primary Examiner* — Thomas B Will
*Assistant Examiner* — Audrey L Lusk
(74) *Attorney, Agent, or Firm* — R. Keith Harrison

(57) ABSTRACT

Portable roller groover assemblies suitable for coupling to a towing vehicle to implement a soil grooving operation may include an assembly frame. The assembly frame may have a frame front, a frame rear, a first frame end and a second frame end, the assembly frame disposed within a frame plane. A grooving hitch interface may be carried by the assembly frame at the frame front. The grooving hitch interface may be configured to facilitate coupling of the towing vehicle to the assembly frame for the grooving operation. A groover may be carried by the assembly frame. The groover may have a plurality of spaced-apart groover disks disposed at least partially beyond the frame plane of the assembly frame. Methods of fabricating a groover for a portable roller groover assembly, groovers for a portable roller groover assembly and methods of forming furrows in soil in a soil grooving operation are also disclosed.

2 Claims, 16 Drawing Sheets

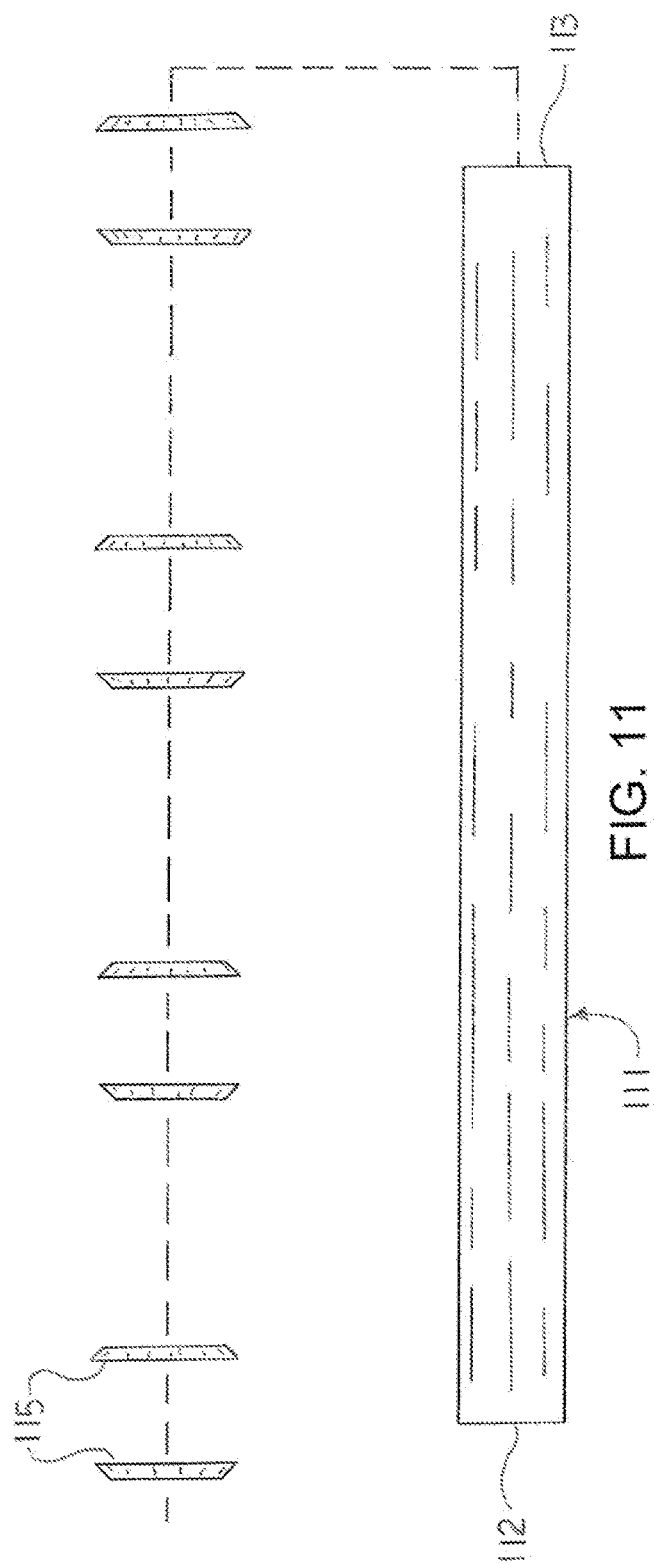
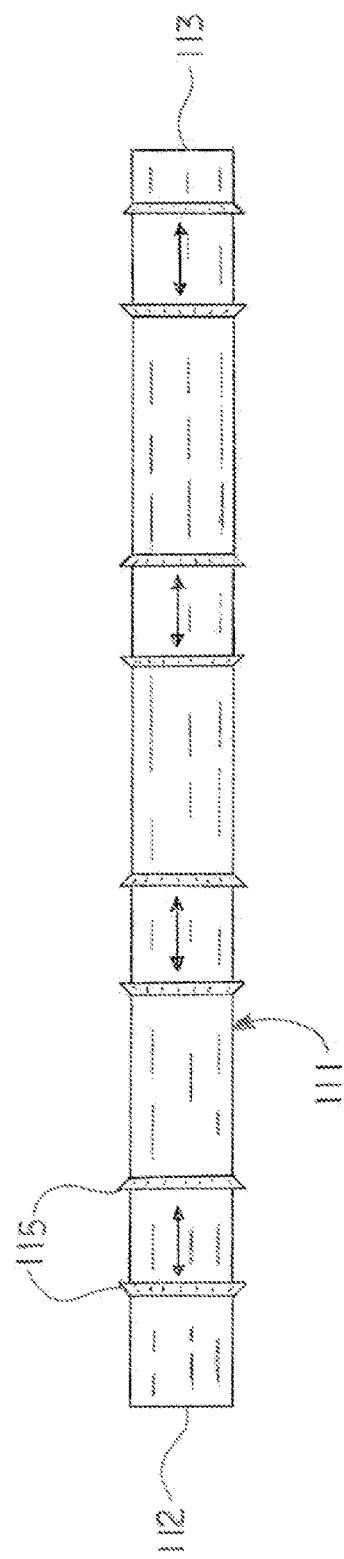
FIG. 11
FIG. 12

PORTABLE ROLLER GROOVER ASSEMBLIES

FIELD

Illustrative embodiments of the disclosure generally relate to agricultural implements and operations. More particularly, illustrative embodiments of the disclosure relate to portable roller groover assemblies suitable for coupling to a towing vehicle to implement a soil grooving operation, groovers, groover fabrication methods and methods of application thereof.

SUMMARY

Illustrative embodiments of the disclosure are generally directed to portable roller groover assemblies suitable for coupling to a towing vehicle to implement a soil grooving operation. An illustrative embodiment of the portable roller groover assemblies may include an assembly frame. The assembly frame may have a frame front, a frame rear, a first frame end and a second frame end, the assembly frame disposed within a frame plane. A grooving hitch interface may be carried by the assembly frame at the frame front. The grooving hitch interface may be configured to facilitate coupling of the towing vehicle to the assembly frame for the grooving operation. A groover may be carried by the assembly frame. The groover may have a plurality of spaced-apart groover disks disposed at least partially beyond the frame plane of the assembly frame.

Illustrative embodiments of the disclosure are further generally directed to groovers for a portable roller groover assembly suitable for coupling to a towing vehicle to implement a soil grooving operation. An illustrative embodiment of the groovers may include an elongated groover body. A plurality of groover disks may be carried by the groover body in spaced-apart relationship to each other. Each of the plurality of groover disks may include complementary, paired, interfacing left and right disk portions.

Illustrative embodiments of the disclosure are further generally directed to methods of fabricating a groover for a portable roller groover assembly. An illustrative embodiment of the methods may include obtaining at least one disk portion blank; cutting a plurality of disk portion cutouts from the at least one disk portion blank; forming a plurality of disk portions from the plurality of disk portion cutouts, respectively; obtaining an elongated groover bldy; placing at least one left and right pair of the plurality of disk portions on the groover body in interfacing relationship to each other; and securing the at least one left and right pair of the plurality of disk portions to each other.

Illustrative embodiments of the disclosure are further generally directed to methods of forming furrows in soil in a soil grooving operation. An illustrative embodiment of the methods may include obtaining a portable disk groover including an assembly frame having a frame front, a frame rear, a first frame end and a second frame end, the assembly frame disposed within a frame plane; a grooving hitch interface carried by the assembly frame at the frame front, the grooving hitch interface configured to facilitate coupling of a towing vehicle to the assembly frame for the soil grooving operation; and a groover carried by the assembly frame, the groover having a plurality of spaced-apart groover disks disposed at least partially beyond the frame plane of the assembly frame; coupling the grooving hitch interface on the assembly frame of the portable disk groover assembly to a towing vehicle; maneuvering the towing vehicle into place on the soil; lowering the portable disk groover assembly onto the soil until the groover disks on the groover extend into the soil; and forming the furrows in the soil by operating the towing vehicle.

BRIEF DESCRIPTION OF THE DRAWINGS

Illustrative embodiments of the disclosure will now be described, by way of example, with reference to the accompanying drawings, in which:

FIG. 11 is an exploded side view of a typical groover body and typical placement of multiple paired, left and right disk portions on the groover body in typical fabrication of each corresponding groover disk on the groover body according to an illustrative embodiment of the groover fabrication methods:

FIG. 12 is a side view of the groover body with the disk portions placed on the groover body, further illustrating movement of the paired left and right disk portions along the groover body into engagement with each other in typical assembly of each corresponding groover disk:

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front". "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7:
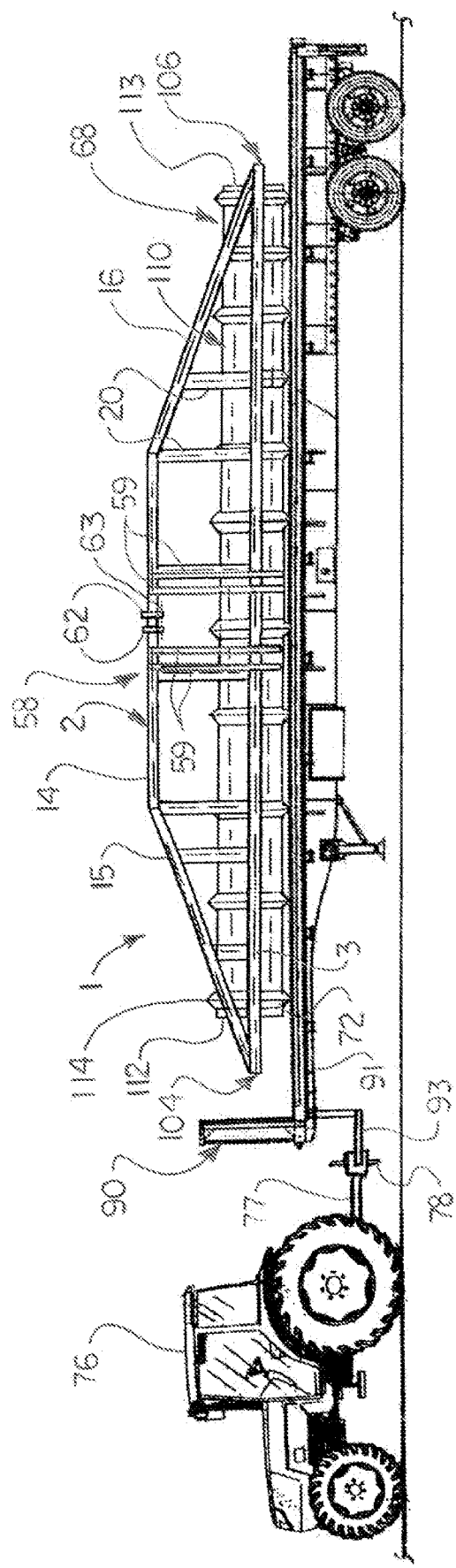
FIG. 7 is a front view of the illustrative portable roller groover assembly, supported in a transport configuration on a trailer bed of a flatbed trailer.
Figure 8:
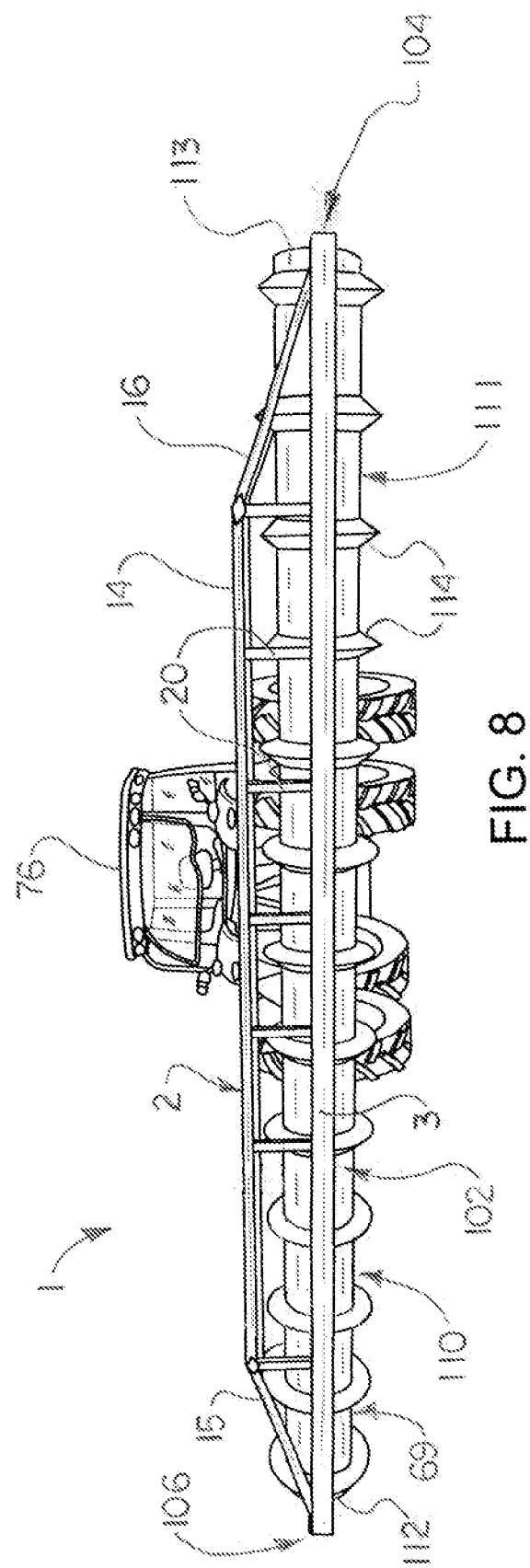
FIG. 8 is a rear perspective view of the illustrative portable roller groover assembly, coupled to a towing vehicle for implementation of the assembly in a soil grooving operation.
Figure 9:
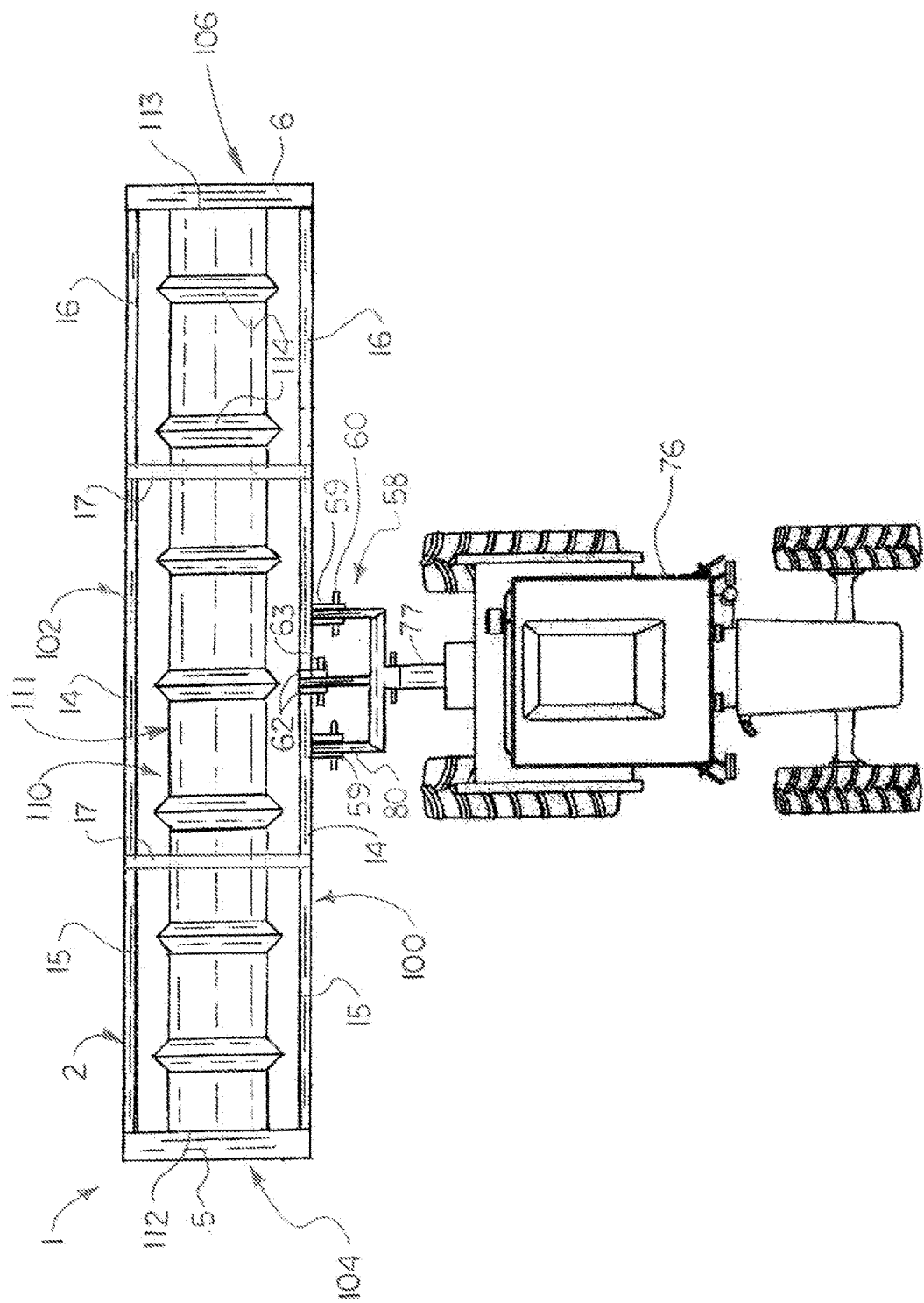
FIG. 9 is a top view of the illustrative portable roller groover assembly coupled to the towing vehicle.
Figure 10:
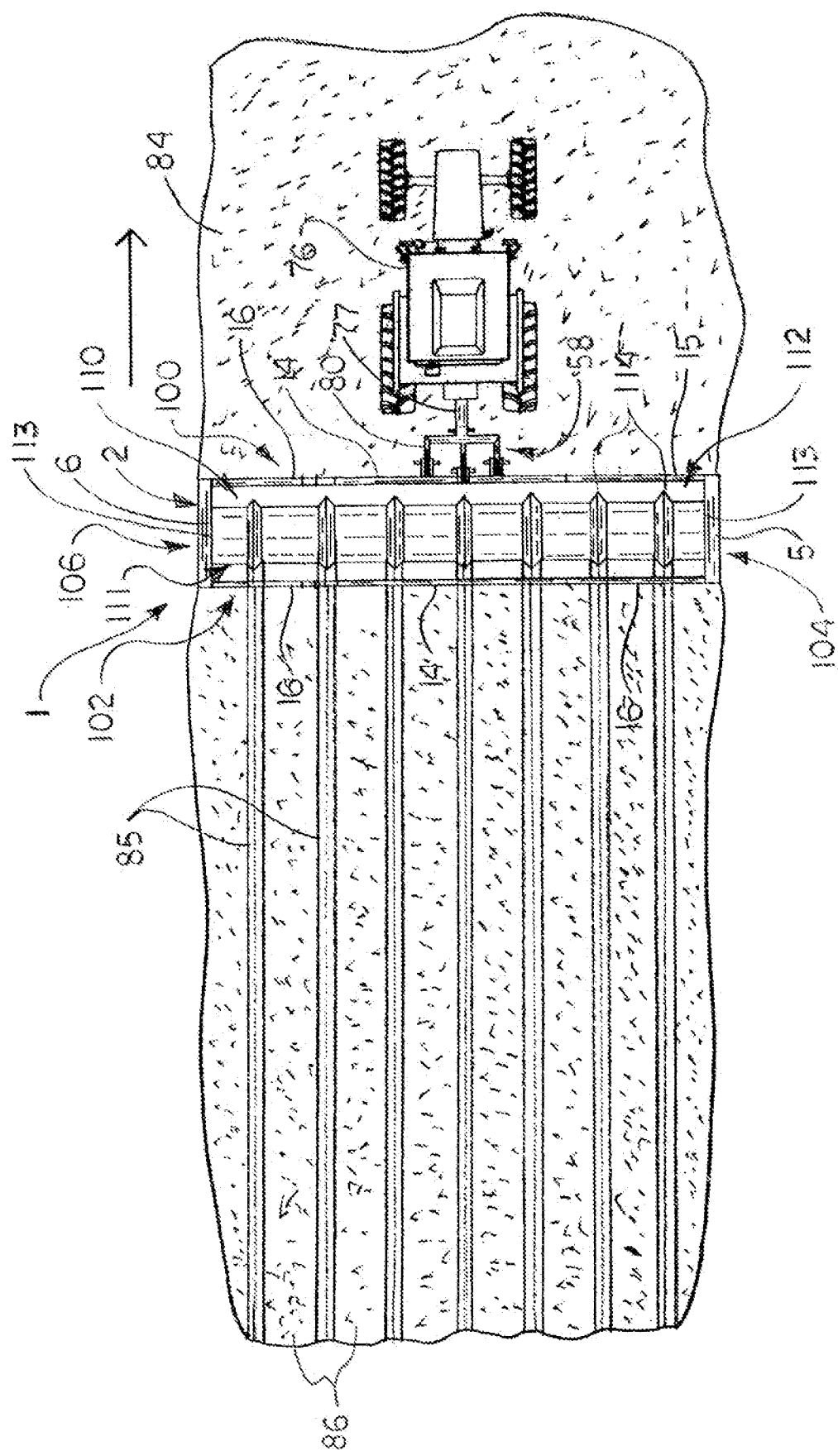
FIG. 10 is a top view of the illustrative portable roller groover assembly, coupled to the towing vehicle and towed on soil to form furrows in the soil in a typical soil grooving operation using the assembly.
Figure 13:
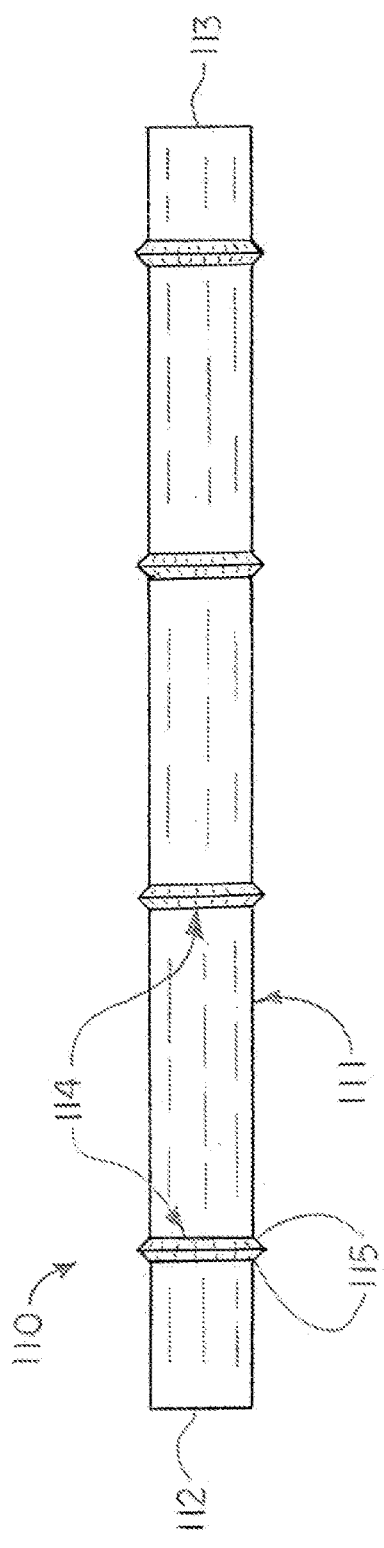
FIG. 13 is a side view of the groover with the assembled groover disks protruding from the groover body.
Figure 15:
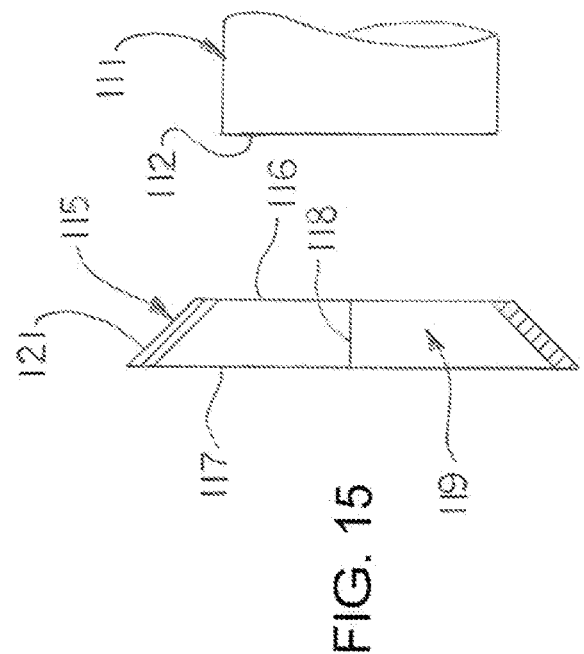
FIG. 15 is a cross-sectional view of a typical right disk portion of each groover disk, illustrating typical placement of the right disk portion on the groover body.
Figure 14:
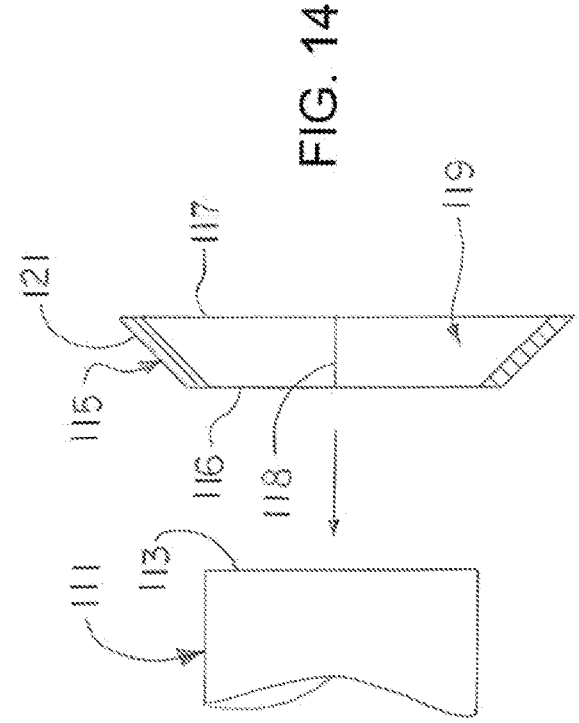
FIG. 14 is a cross-sectional view of a typical left disk portion of each groover disk, more particularly illustrating typical deployment of the left disk portion on the groover body.
Figure 16:
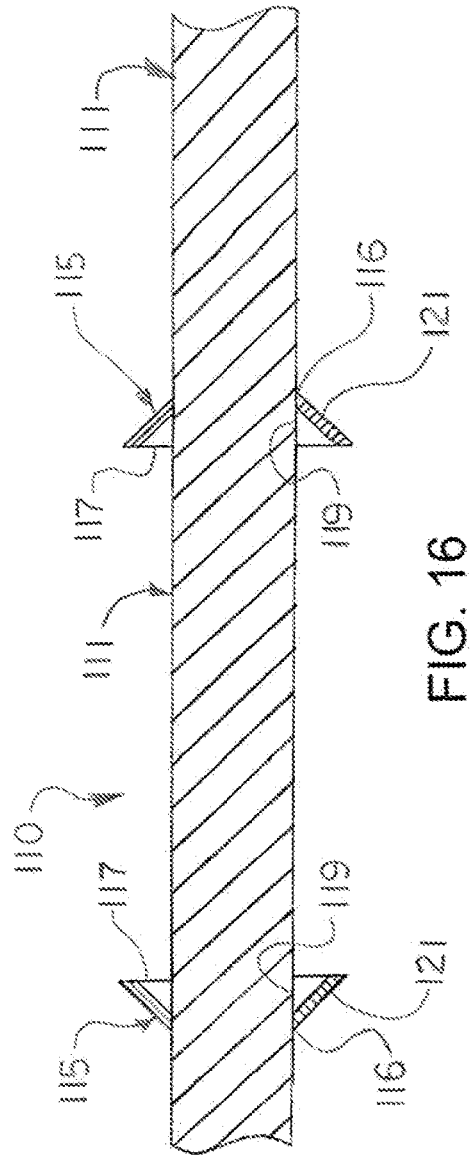
FIG. 16 is a longitudinal sectional view of a left disk portion and a right disk portion of a groover disk on the groover body before movement of the left and right disk portions along the groover body and into engagement with each other to assemble the groover disk.
Figure 17:
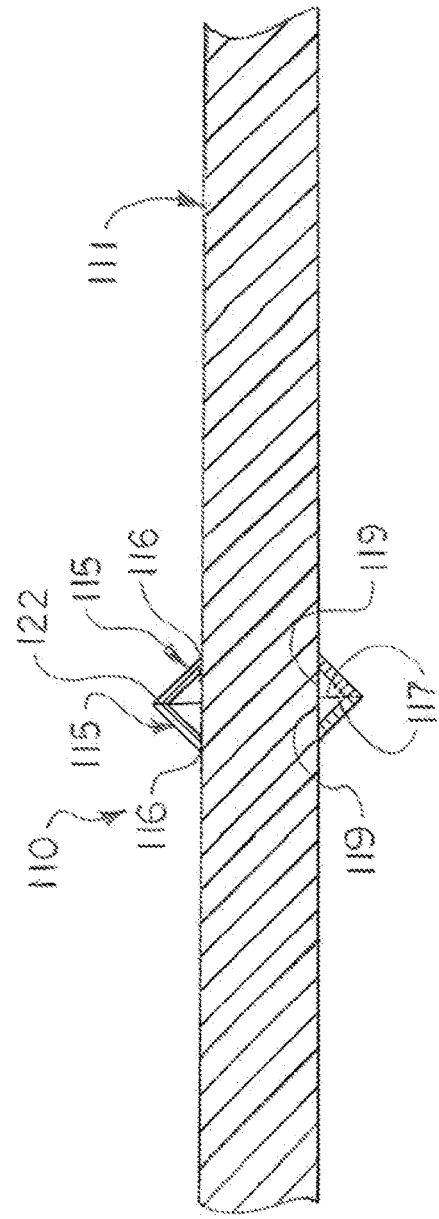
FIG. 17 is a longitudinal sectional view of the left and right disk portions and the groover body with the disk portions moved into engagement with each other in the assembled groover disk.

Referring initially to FIGS. 7-10 of the drawings, an illustrative embodiment of the portable roller groover assembly, hereinafter assembly, is generally indicated by reference numeral 1. As illustrated in FIG. 7 and will be hereinafter described, in typical application, the assembly 1 may initially be transported on a flatbed trailer 90 towed by a towing vehicle 76 or transported using other suitable towing vehicle to facilitate carrying or transport of the assembly 1 to a destination for use. At the destination of use, the assembly 1 may be removed from the flatbed trailer 90 to facilitate operation of the assembly 1 in a soil grooving operation as the assembly 1 is towed on soil 84 behind the towing vehicle 76, as illustrated in FIG. 10. In the soil grooving operation, the assembly 1 may form multiple grooves or furrows 85 in the soil 84 typically for planting, irrigation, drainage and/or other purposes.

Figure 1:
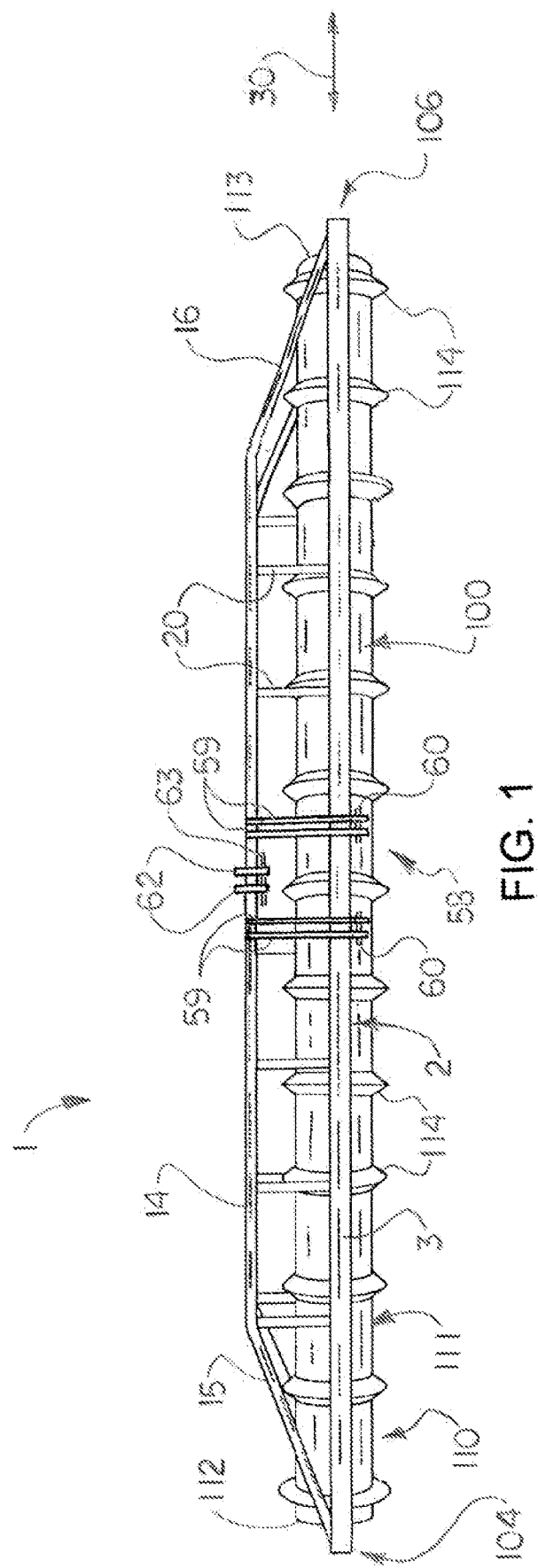
FIG. 1 is a front perspective view of an illustrative embodiment of the portable roller groover assemblies.
Figure 2:
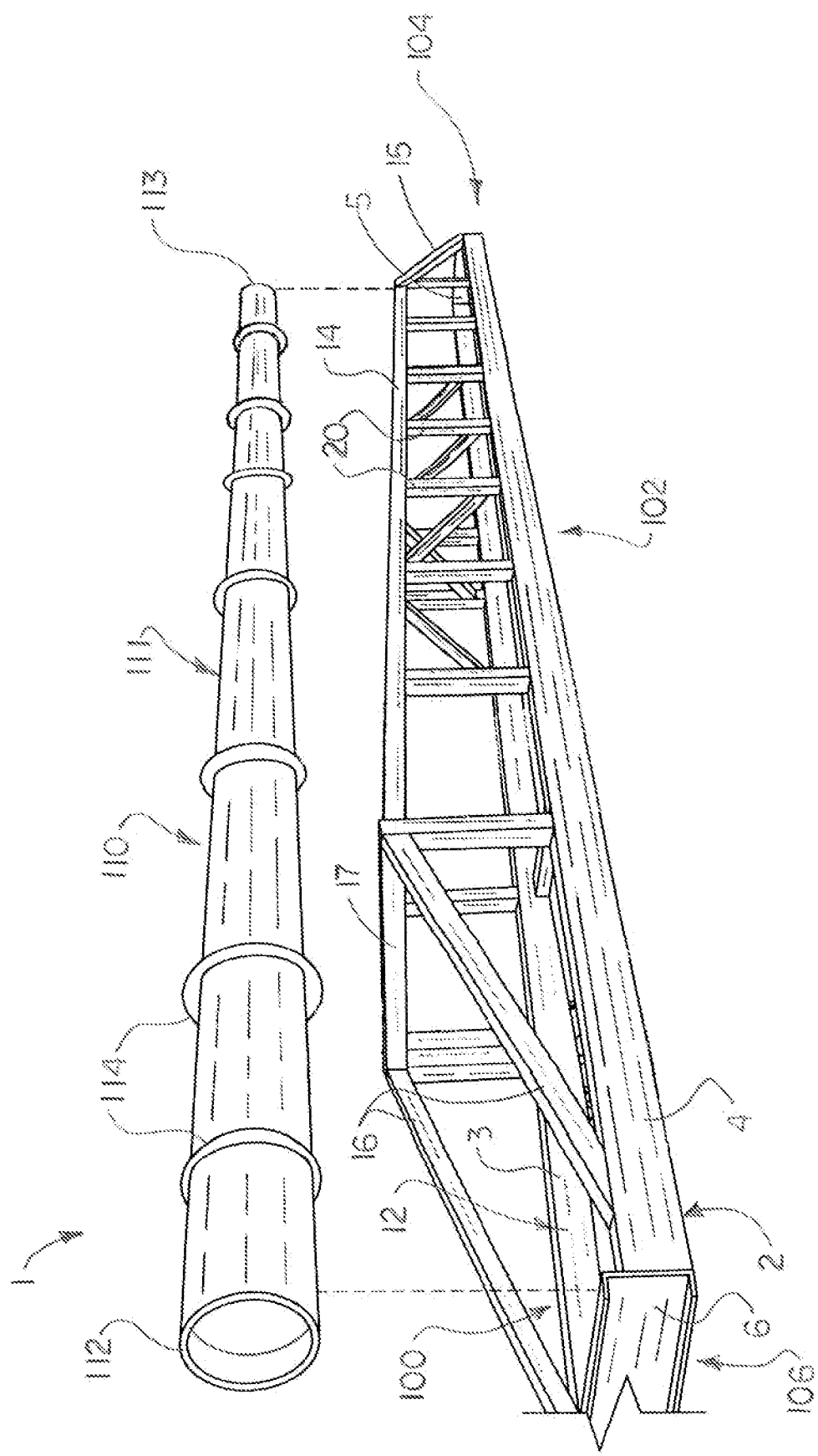
FIG. 2 is an exploded rear perspective view, partially in section, of the illustrative portable roller groover assembly, with a groover shown detached from an assembly frame of the assembly.
Figure 3:
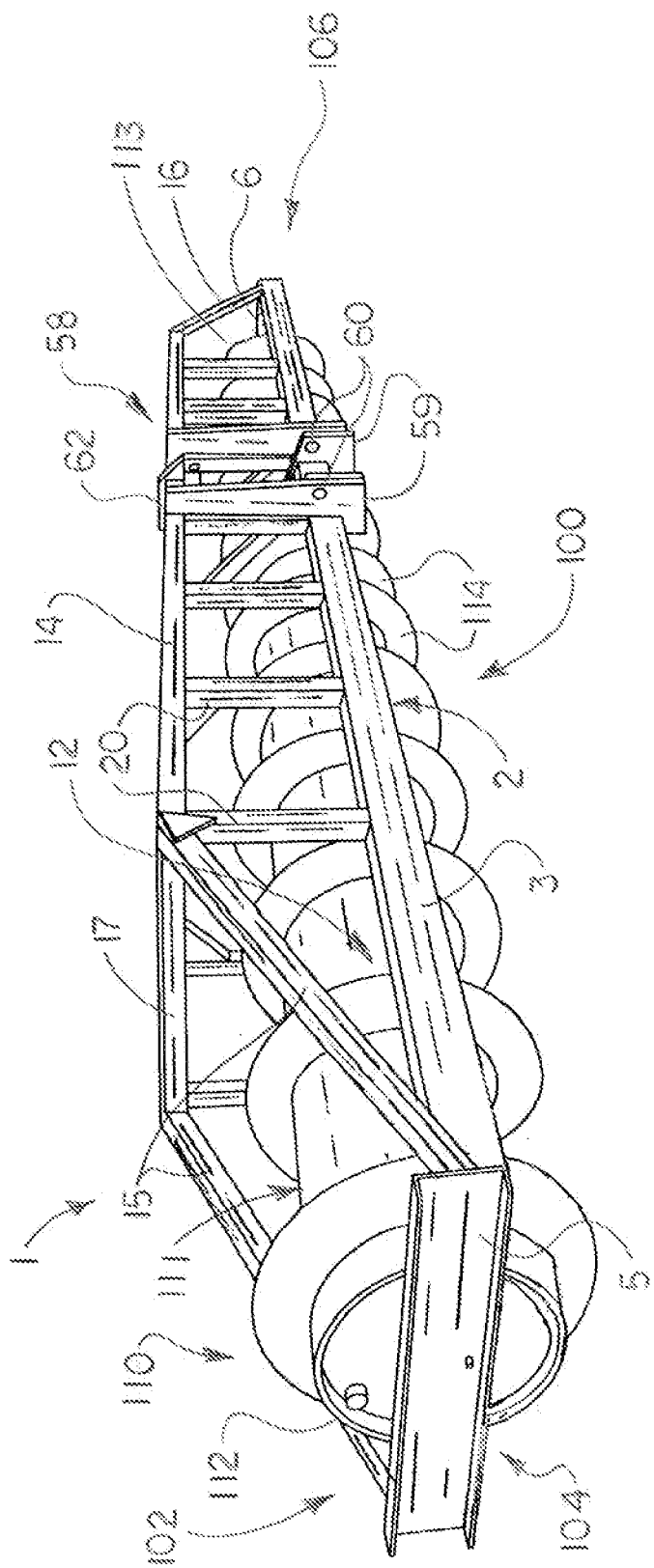
FIG. 3 is a front perspective view of the illustrative portable roller groover assembly.
Figure 4:
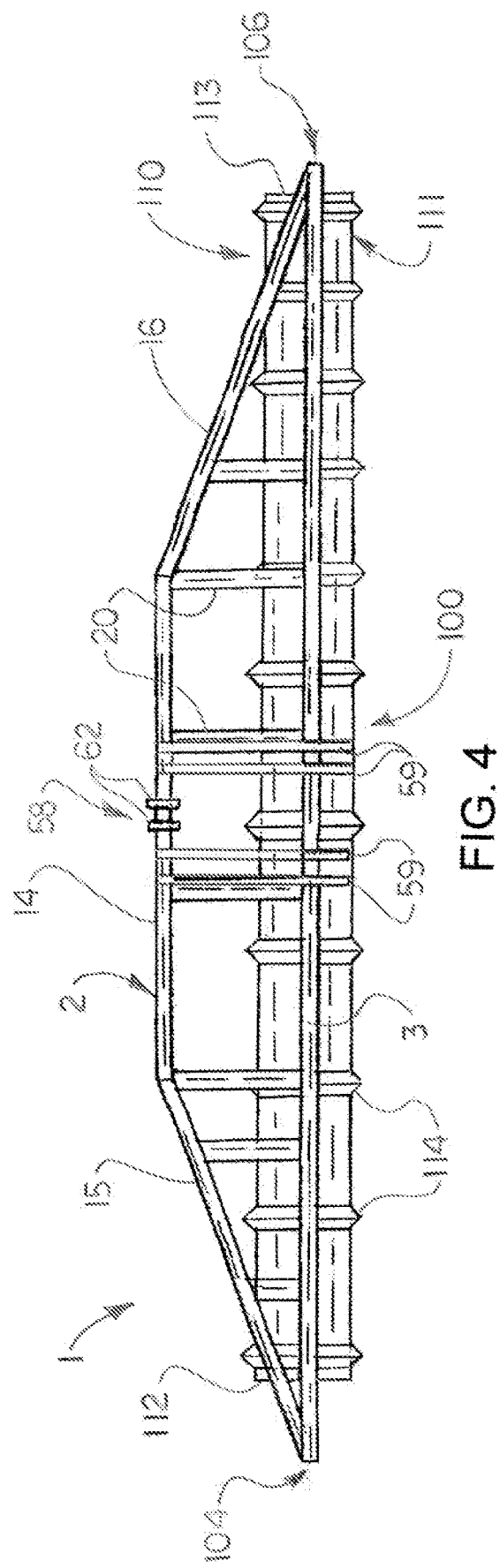
FIG. 4 is a front view of the illustrative portable roller groover assembly.
Figure 5:
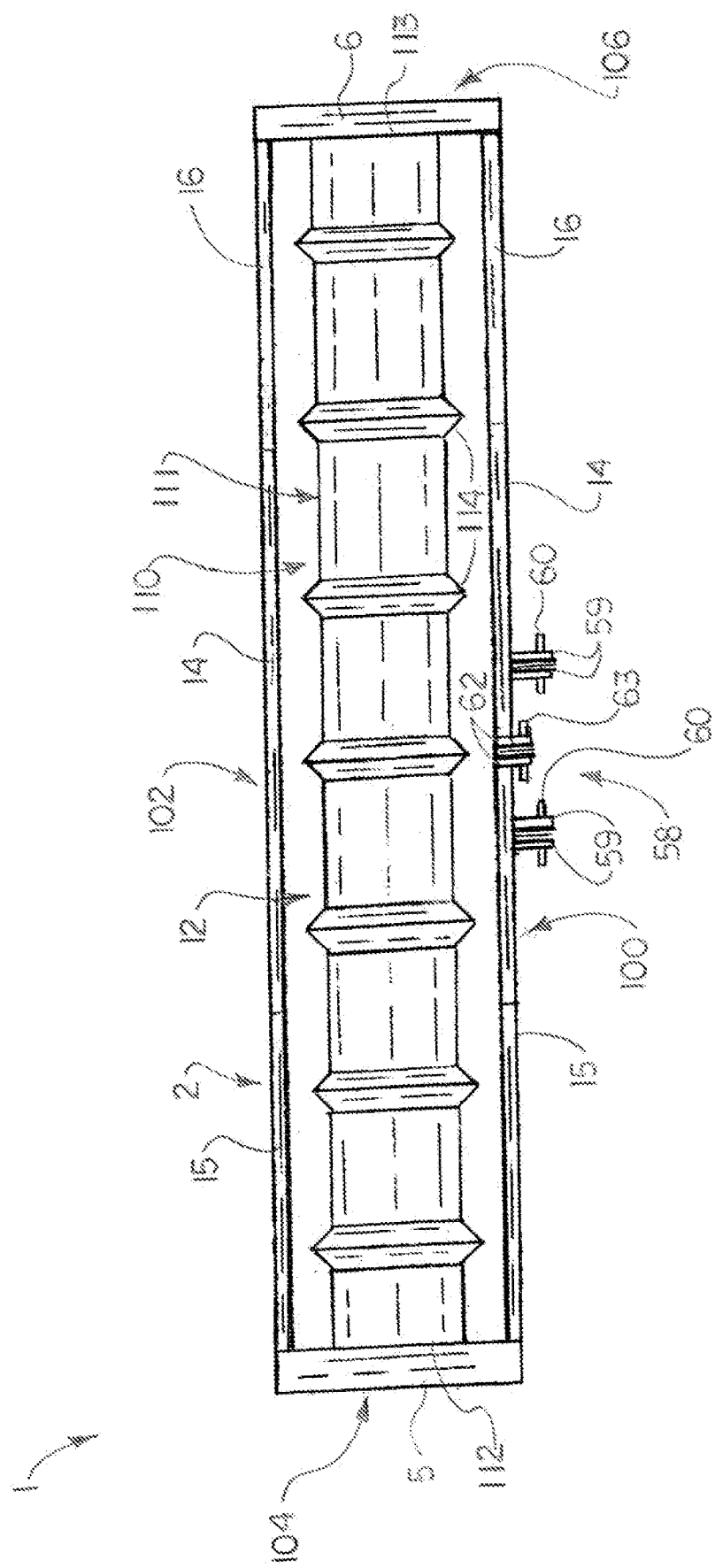
FIG. 5 is a top view of the illustrative portable roller groover assembly.

Referring next to FIGS. 1-6 of the drawings, the assembly 1 may include an assembly frame 2. As illustrated in FIG. 5, in some embodiments, the assembly frame 2 may be elongated and rectangular with a frame front 100, a frame rear 102, a first frame end 104 and a second frame end 106. As illustrated in FIGS. 2 and 5, the assembly frame 2 may have a frame interior 12.

The assembly frame 2 may have an elongated front base frame member 3 at the frame front 100. An elongated rear base frame member 4 may be disposed in parallel, spaced-apart relationship to the front base frame member 3 at the frame rear 102. A first end frame member 5 and a second end frame member 6 may extend between the front base frame member 3 and the rear base frame member 4 at the first frame end 104 and the second frame end 106, respectively. The frame interior 12 may be formed by and between the front base frame member 3, the rear base frame member 4, the first end frame member 5 and the second end frame member 6. As illustrated in FIG. 1, the front base frame member 3, the rear base frame member 4, the first end frame member 5 and the second end frame member 6 of the assembly frame 2 may be disposed within a frame plane 30.

In some embodiments, a pair of upper frame members 14 may extend above and in parallel relationship to the respective front base frame member 3 and rear base frame member 4 of the assembly frame 2. A first pair of sloped frame members 15 may angle from the respective upper frame members 14 to the first frame end 104 of the assembly frame 2. In some embodiments, the extending ends of the first pair of sloped frame members 15 may terminate on the respective front base frame member 3 and rear base frame member 4 at or adjacent to the first end frame member 5. A second pair of sloped frame members 16 may angle from the upper frame members 14, respectively, to the second frame end 106 of the assembly frame 2. In some embodiments, the extending ends of the second pair of sloped frame members 16 may terminate on the respective front base frame member 3 and rear base frame member 4 at or adjacent to the second end frame member 6.

At least one vertical frame member 20 may extend between each upper frame member 14 and each corresponding one of the front base frame member 3 and the rear base frame member 4. As illustrated in FIGS. 2 and 3, in some embodiments, at least one transverse frame member 17 may extend between the upper frame members 14, the first pair of sloped frame members 15 and/or the second pair of sloped frame members 16.

A grooving hitch interface 58 may be provided on the assembly frame 2 at the frame front 100. The grooving hitch interface 58 may be configured to facilitate coupling of the towing vehicle 76 to the assembly frame 2 in the grooving configuration, as illustrated in FIGS. 9 and 10. The grooving hitch interface 58 may have any design which is suitable for the purpose. Accordingly, as illustrated in FIGS. 4 and 5, in some embodiments, the grooving hitch interface 58 may include first and second pairs of elongated, parallel, spaced-apart side hitch plates 59 and a pair of spaced-apart upper hitch plates 62 on the assembly frame 2. The side hitch plates 59 may vertically span the front base frame member 3 and the corresponding upper frame member 14 at the frame front 100 of the assembly frame 2. The upper hitch plates 62 may be disposed between the pairs of side hitch plates 59 on the upper frame member 14.

As illustrated in FIG. 5, a side hitch pin 60 may extend through registering pin openings (not illustrated) provided in each pair of side hitch plates 59. An upper hitch pin 63 may extend through registering pin openings (not illustrated) in the upper hitch plates 62. The side hitch pins 60 and the upper hitch pin 63 may facilitate pinned connection of a grooving hitch 80 (FIG. 9) to the side hitch plates 59 and the upper hitch plates 62 in typical coupling of the grooving hitch 80 to the grooving hitch interface 58.

A groover 110 may be supported by the assembly frame 2. The groover 110 may be disposed in the frame interior 12 of the assembly frame 2. The groover 110 may include an elongated groover body 111. In some embodiments, the groover body 111 may be generally cylindrical, as illustrated. The groover body 111 may be generally coextensive with the assembly frame 2 and may have a first groover end 112 and a second groover end 113. The first groover end 112 may be disposed at or proximate the first frame member 5, and the second groover end 113 may be disposed at or proximate the second frame member 6, of the assembly frame 2.

Figure 6:
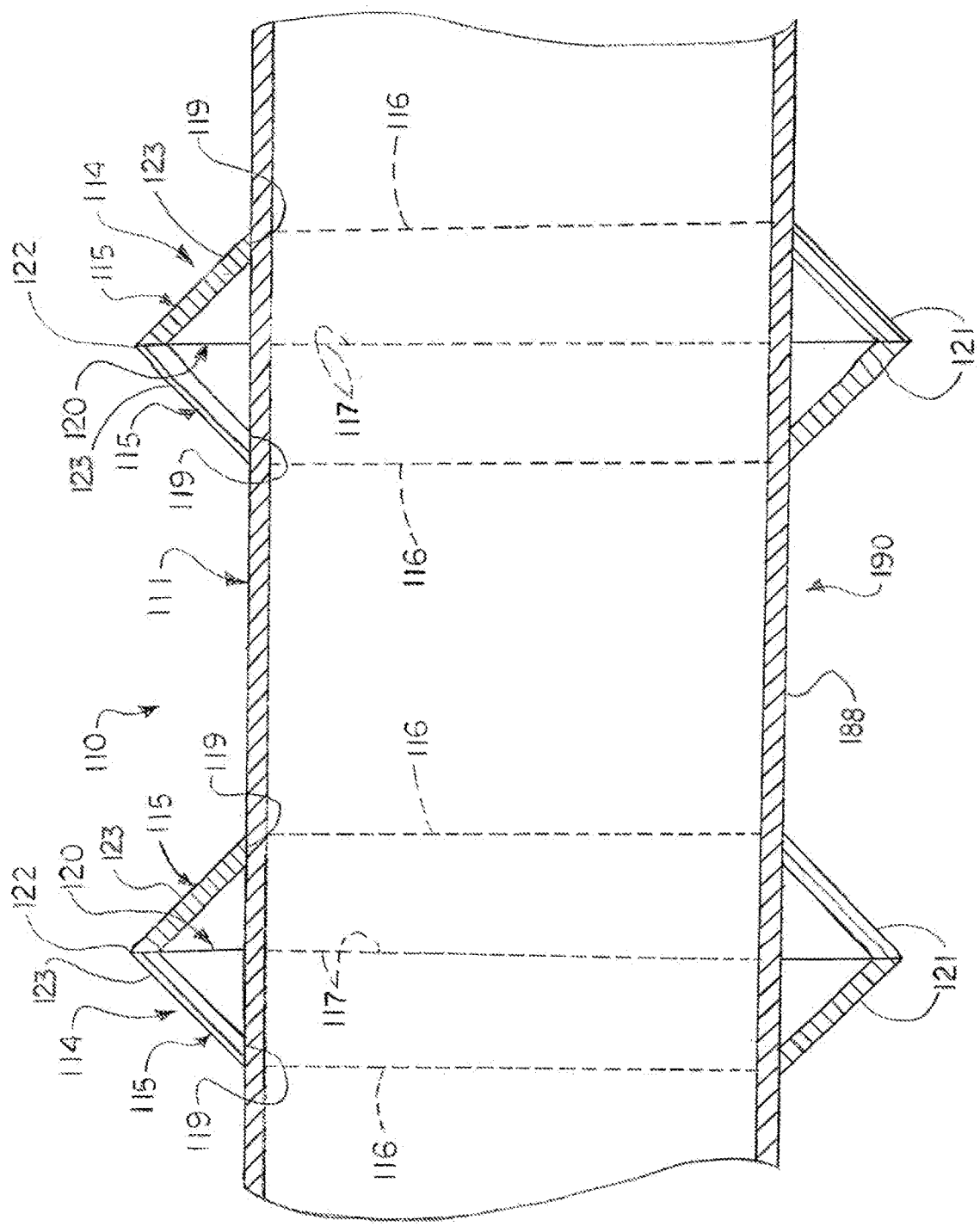
FIG. 6 is an enlarged longitudinal sectional view of a portion of a typical groover of the portable roller groover assemblies, more particularly illustrating a pair of groover disks extending from a groover body of the groover.

Multiple groover disks 114 may extend outwardly from the groover body 111 in spaced-apart relationship to each other. As illustrated in FIG. 1, each groover disk 114 may be disposed at least partially beyond or below the frame plane 30 of the frame interior 12. In some embodiments, each groover disk 114 may protrude from the frame interior 12 of the assembly frame 2. As illustrated in FIG. 6, each groover disk 114 may have a pair of annular disk sides 123 which taper in an angled trajectory from the groover body 111 and converging at an annular outer disk edge 122. The groover body 111 may have a vacant groover body segment 188 which extends between the adjacent groover disks 114 and is devoid of groover disks 114. The vacant groover body segment 188 may define an inter-disk space 190 between each pair of adjacent groover disks 114.

As illustrated in FIG. 6, in some embodiments, the groover body 111 of the groover 110 may include an elongated pipe, conduit or other member. In some embodiments, the groover body 111 may be cylindrical. Each groover disk 114 may include a pair of complementary, left and right disk portions 115. Each disk portion 115 may have an outer disk portion edge 116 and an inner disk portion edge 117. A central disk portion opening 119 may be formed by the outer disk portion edge 116. The central disk portion opening 119 may be sized and configured to receive and accommodate the groover body 111 of the groover 110. A disk portion joining line 120 may join the interfacing inner disk portion edges 117 of the respective disk portions 115 in each assembled groover disk 114.

As further illustrated in FIG. 6, each disk portion 115 may have a sloped or angled outer disk portion surface 121 which extends from the outer disk portion edge 116 to the inner disk portion edge 117. In some embodiments, the outer disk portion surfaces 121 may be oriented at an angle of 68 degrees to each other. In other embodiments, the outer disk portion surfaces 121 may be oriented at angles greater or less than 68 degrees to each other. Each groover disk 114 may have an outer disk edge 122 formed by the outer disk portion surfaces 121 at the disk portion joining line 120.

The groover body 111 of the groover 110 may be mounted in the frame interior 12 and attached to the assembly frame 2 according to the knowledge of those skilled in the art. Mounting techniques suitable for the purpose may include but are not limited to welding, brackets, bolts and/or other mechanical fasteners known by those skilled in the art.

Referring next to FIGS. 7-10 of the drawings, in typical application, the assembly 1 may initially be towed, carried, or otherwise transported from a storage location to a desired destination for use. As illustrated in FIG. 7, in some applications, the assembly 1 may initially be lifted and placed on the flatbed trailer bed 91 of the flatbed trailer 90. The towing vehicle 76 may be operated in reverse to facilitate approach of the towing hitch 77 toward a trailer hitch 93 at the leading end of the flatbed trailer bed 91. Rearward operation of the towing vehicle 76 may continue until the towing hitch 77 on the towing vehicle 76 engages with the trailer hitch 93. In some applications, the trailer hitch 93 may be fitted with a hitch ball (not illustrated). The towing hitch 77 may include a ball-receiving hitch receptacle (not illustrated) which receives the hitch ball on the trailer hitch 93, typically in the conventional manner. In some applications, a towing hitch pin 78 may be extended through registering pin openings (not illustrated) in the towing hitch 77 and the trailer hitch 93, respectively, and secured to complete the coupling operation. The assembly 1 may be transported to the desired destination for use on the flatbed trailer 90 by forward operation of the towing vehicle 76. Upon arrival at the destination, the assembly 1 may be removed from the flatbed trailer bed 91 of the flatbed trailer 90 preparatory to use.

The towing vehicle 76 may be fitted with the grooving hitch 80 (FIG. 9) to facilitate coupling of the towing vehicle 76 to the assembly 1 and towing of the assembly 1 on the soil 84 (FIG. 10) in the grooving operation. Accordingly, the towing vehicle 76 may initially be maneuvered forwardly of the frame front 100 of the frame assembly 2, with the grooving hitch 80 positioned in alignment with the grooving hitch interface 58. The towing vehicle 76 may then be operated in reverse typically until the grooving hitch 80 registers or aligns with the side hitch plates 59 and the upper hitch plates 62 of the grooving hitch interface 58. The side hitch pins 60 (FIG. 5) may be deployed to couple the grooving hitch 80 to the side hitch plates 59, and the upper hitch pin 63 may be deployed to couple the grooving hitch 80 to the upper hitch plates 62.

After coupling of the assembly 1 to the towing vehicle 76 at the grooving hitch interface 58 is complete, the grooving hitch 80 and assembly 1 coupled thereto may be lowered until the groover disks 114 of the groover 110 penetrate the ground level 32 at the surface of the soil 84 in which the furrows are to be formed. As illustrated in FIG. 10, the towing vehicle 76 may then be operated in the forward direction to tow the assembly 1 behind the towing vehicle 76. As the assembly 1 moves forwardly, the groover disks 114 of the groover 110 may form the respective furrows 85 in the soil 84. The furrows 85 may be used for planting, irrigation, drainage and/or other agricultural purposes. The furrow space 86 between the adjacent furrows 85 may correspond to the length of each inter-disk space 190 between each pair of adjacent groover disks 114. In some applications, the towing vehicle 76 may be operated in multiple passes across the soil 84 to form the furrows 85 across the desired surface area of the soil 84.

Upon completion of the soil grooving operation, the assembly 1 may be lifted and placed back on the flatbed trailer bed 91 of the flatbed trailer 90. The grooving hitch 80 may be uncoupled from the grooving hitch interface 58, and the towing vehicle 76 may be maneuvered to the front of the flatbed trailer 90. The towing hitch 77 on the towing vehicle 76 may again be coupled to the trailer hitch 93 on the flatbed trailer 90, as was heretofore described with respect to FIG. 7, and the assembly 1 transported to the desired location.

Figure 18:
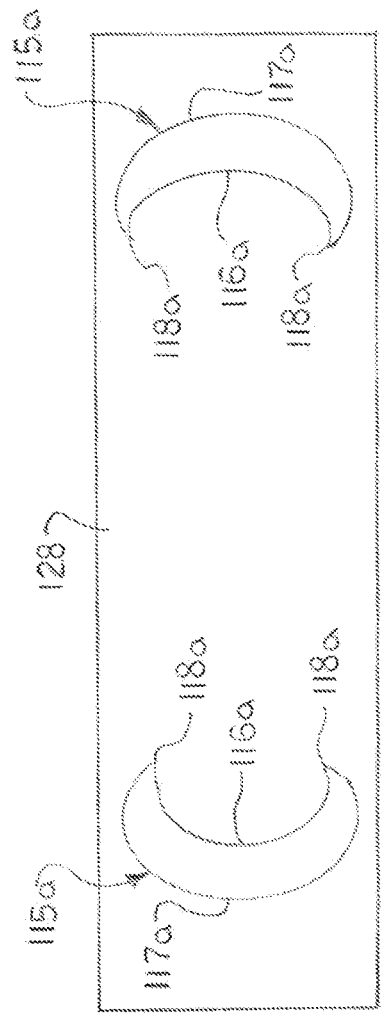
FIG. 18 is a top view of a typical disk portion blank with a pair of right and left disk portion cutouts cut from the disk portion blank.

Referring next to FIGS. 11-20 of the drawings, an illustrative method of fabricating a groover 110 (FIG. 13) for a portable roller groover assembly 1 may include obtaining at least one disk portion blank 128, as illustrated in FIG. 18. The disk portion blank 128 may include steel, other metals, composite material, other materials suitable for the purpose, or any combination thereof.

Figure 19:
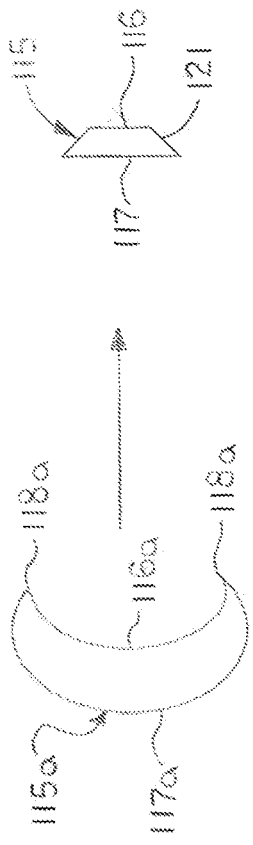
FIG. 19 is a side view illustrating typical rolling of the right disk portion cutout to form the corresponding right disk portion of each groover disk.
Figure 20:
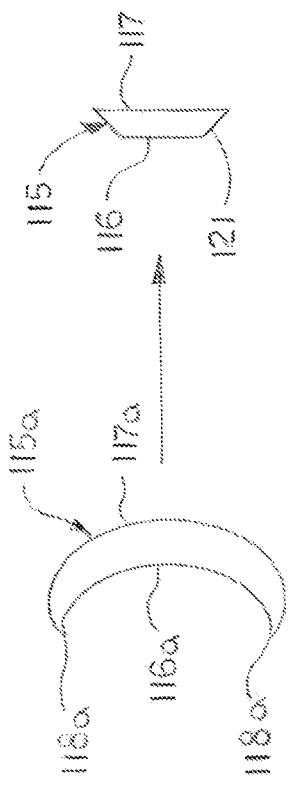
FIG. 20 is a side view illustrating typical rolling of the left disk portion cutout to form the corresponding left disk portion of each groover disk.

As illustrated in FIGS. 18-20, multiple disk portion cutouts 115a may be cut from the disk portion blank 128, such as by using a plasma torch or water jet cutter, for example and without limitation. Each disk portion cutout 115 may generally have a curved, half-moon shape with a cutout outer edge 116a and a cutout inner edge 117a. A pair of spaced-apart cutout side edges 118a may extend between the cutout outer edge 116a and the cutout inner edge 117a.

As illustrated in FIGS. 19 and 20, each disk portion cutout 115a may be rolled to form an annular disk portion 115. The outer disk portion edge 116 and the inner disk portion edge 117 of each disk portion 115 may correspond to the cutout outer edge 116a and cutout inner edge 117a, respectively, of the corresponding disk portion cutout 115a. The cutout side edges 118a of the disk portion cutout 115a may be joined to form a disk portion seam 118 (FIGS. 14 and 15) in the disk portion 115. The disk portion seam 118 may be formed or secured by welding, brackets, mechanical fasteners and/or other suitable fastening technique known by those skilled in the art.

As illustrated in FIGS. 18 and 19, the groover 110 (FIG. 13) may be assembled by deploying the disk portions 115 in left and right pairs on the groover body 111 and attaching the paired disk portions 115 to each other to form each corresponding groover disk 114. The interfacing inner disk portion edges 117 on the respective disk portions 115 may be joined to each other along the disk portion joining line 120 (FIG. 6). Each disk portion joining line 120 may be formed using any suitable technique or combination of techniques known by those skilled in the art. For example and without limitation, in some embodiments, the disk portion joining line 120 may be formed by welding. Additionally or alternatively, the disk portion joining line 120 may be formed using brackets and/or other mechanical fasteners known by those skilled in the art.

The disk portion 115 of each groover disk 114 may be attached to the groover body 111 such as by welding, brackets and/or other mechanical fasteners or techniques known by those skilled in the art. After its fabrication is completed, the groover 110 may be installed on an assembly frame 2 (FIGS. 1-5) to assemble the portable roller groover assembly 1.

As illustrated in FIGS. 11-15, the disk portions 115 of each corresponding groover disk 114 may be deployed in place on the groover body 111 by inserting the first groover end 112 or the second groover end 113 of the groover body 111 through the disk portion opening 119 of each disk portion 115 as the disk portion 115 is moved into place on the groover body 111. The groover disks 114 may be provided in any desired number and spacing on the groover body 111 depending typically on the number and spacing of the furrows 85 (FIG. 10) which are to be formed in the soil 84 in the soil grooving operation. After the paired left and right disk portions 115 of each groover disk 114 are in place on the desired location along the length of the groover body 111, the inner disk portion edges 117 may be welded and/or otherwise attached to each other along the disk portion joining line 120. The disk portions 115 may then be welded and/or otherwise attached to the groover body 111 according to the knowledge of those skilled in the art.

Figure 21:
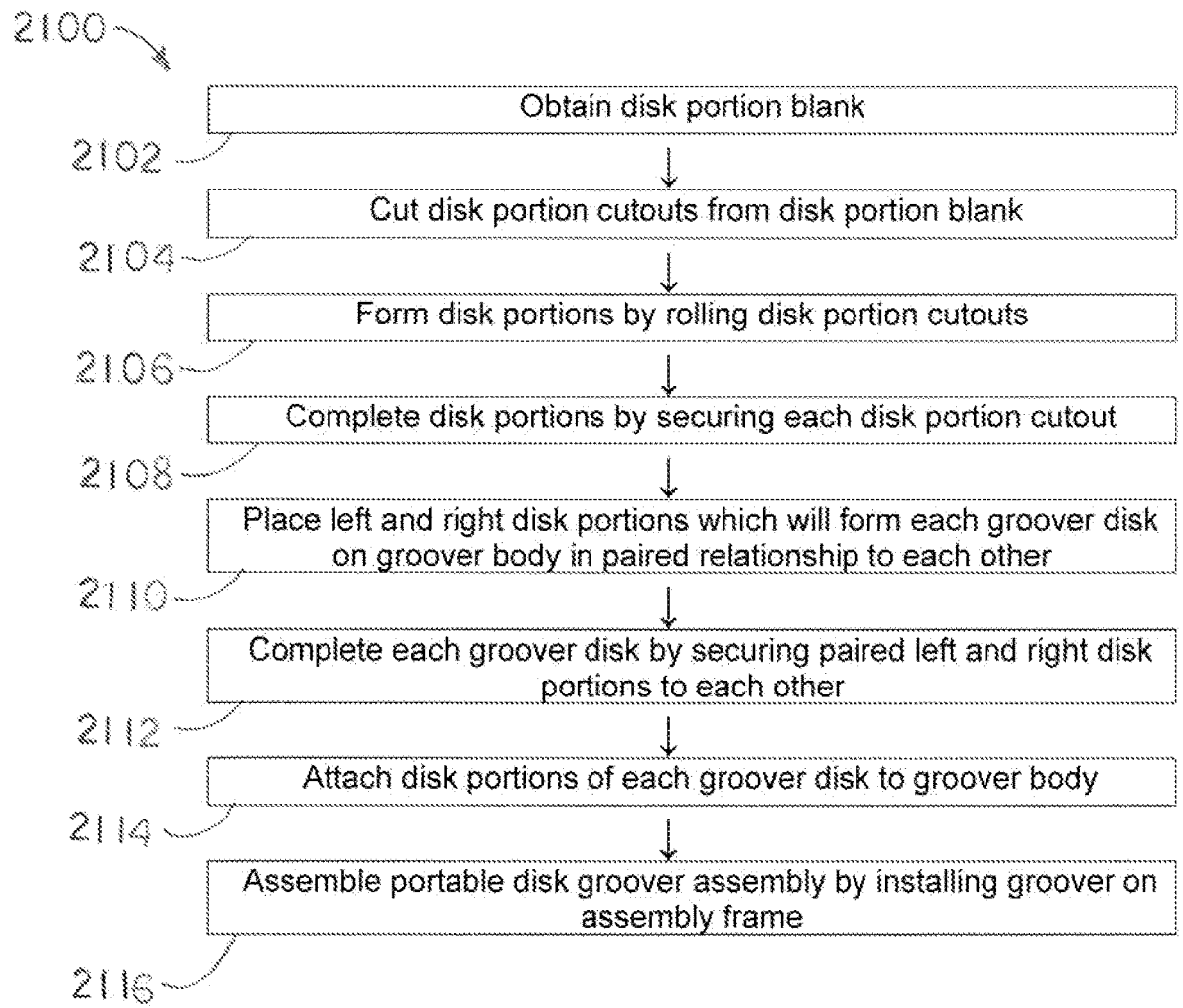
FIG. 21 is a flow diagram of an illustrative embodiment of the groover fabrication methods.

Referring next to FIG. 21 of the drawings, a flow diagram of an illustrative embodiment of the groover fabrication methods is generally indicated by reference numeral 2100. At Step 2102, at least one disk portion blank may be obtained. At Step 2104, disk portion cutouts which will form the respective left and right disk portions of each groover disk may be cut from the disk portion blank. At Step 2106, a plurality of disk portions may be rolled and/or otherwise formed in the disk portion cutouts, respectively. At Step 2108, each disk portion may be completed by securing each disk portion cutout via welding, mechanical fasteners and/or other technique. At Step 2110, the left and right disk portions of each groover disk may be placed on the groover body in paired, adjacent relationship to each other. At Step 2112, each disk portion may be completed by securing the left and right disk portions to each other along a disk portion joining line. At step 2014, a groover may be assembled by attaching the disk portions of each groover disk to the groover body. At Step 2116, a portable disk groover assembly may be assembled by installing the groover on an assembly frame.

Figure 22:
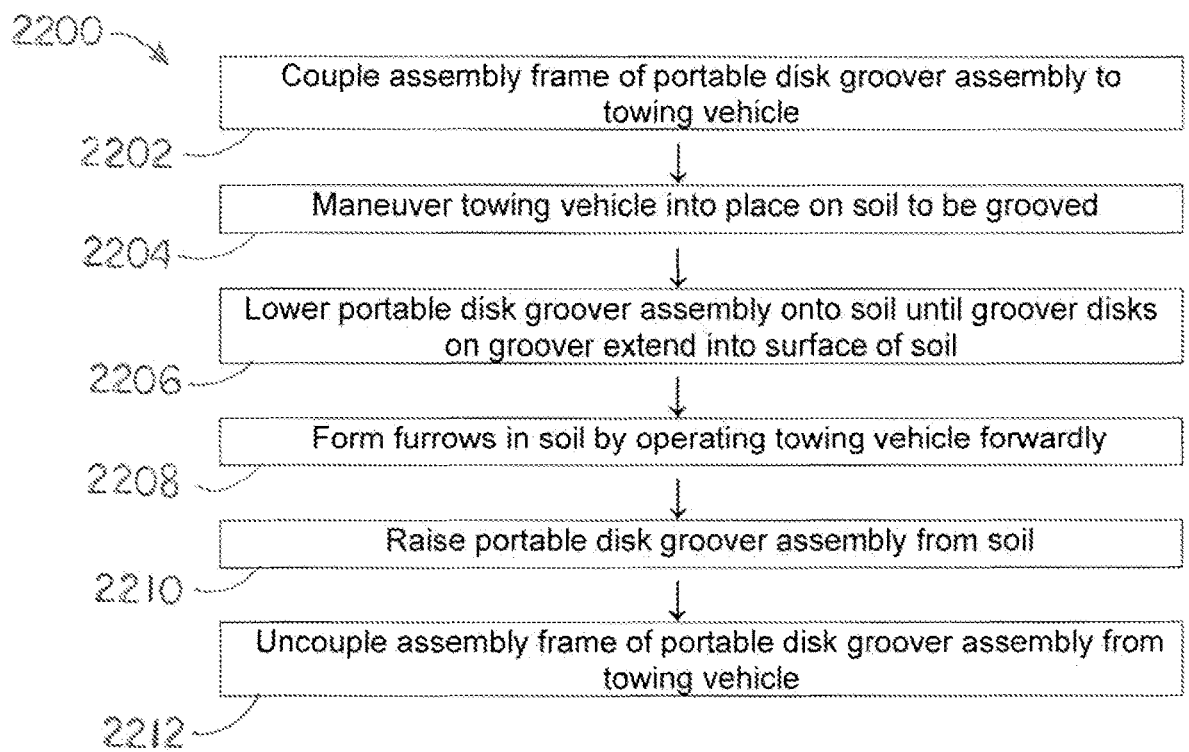
FIG. 22 is a flow diagram of an illustrative embodiment of the methods of forming furrows in soil in a soil grooving operation.

Referring next to FIG. 22 of the drawings, a flow diagram of an illustrative embodiment of the methods of forming furrows in soil in a soil grooving operation is generally indicated by reference numeral 2200. At Step 2202, an assembly frame of a portable disk groover assembly may be coupled to a towing vehicle. At Step 2204, the towing vehicle may be maneuvered into place on the soil to be grooved. At Step 2206, the portable disk groover assembly may be lowered onto the soil until the groover disks on the groover extend into the surface of the soil. At Step 2208, furrows may be formed in the soil by operating the towing vehicle forwardly. At Step 2210, the portable disk groover assembly may be raised from the soil. At Step 2212, the assembly frame of the portable disk groover assembly may be uncoupled from the towing vehicle.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A portable roller groover assembly for coupling to a towing vehicle to implement a soil grooving operation for formation of spaced-apart grooves or furrows in soil and furrow spaces between the furrows, comprising:

an elongated, rectangular assembly frame including:
a frame front, a frame rear, a first frame end and a second frame end;
an elongated front base frame member at the frame front;
an elongated rear base frame member at the frame rear;
a first end frame member extending between the front base frame member and the rear base frame member at the first frame end;
a second end frame member extending between the front base frame member and the rear base frame member at the second frame end, the front base frame member, the rear base frame member, the first end frame member and the second end frame member disposed within a frame plane;
a frame interior formed by the front base frame member, the rear base frame member, the first end frame member and the second end frame member; and
a pair of elongated, parallel, spaced-apart upper frame members carried by the frame base frame member and the rear base frame member, respectively;
a grooving hitch interface carried by the front base frame member and a corresponding one of the pair of upper frame members of the assembly frame at the frame front, the grooving hitch interface configured to facilitate coupling of the towing vehicle to the assembly frame for the grooving operation; and
a single groover carried by the assembly frame and disposed in the frame interior of the assembly frame, the groover having:

an elongated, cylindrical groover body;

a plurality of spaced-apart groover disks extending from the groover body and protruding from the frame interior and disposed at least partially beyond the frame plane of the assembly frame, each of the plurality of spaced-apart groover disks including a pair of disk sides tapering in an angled trajectory from the groover body and converging at an annular outer disk edge, the groover body having a first groover end at the first end frame member and a second groover end at the second end frame member of the assembly frame;

the groover body having a plurality of vacant groover body segments extending between the plurality of spaced-apart groover disks, each of the plurality of vacant groover body segments defining an inter-disk space between adjacent ones of the plurality of spaced-apart groover disks, the inter-disk space devoid of the plurality of spaced-apart groover disks;

each of the plurality of spaced-apart groover disks comprising:
- a pair of complementary disk portions, each of the pair of complementary disk portions comprising an outer disk portion edge, an inner disk portion edge and a central disk portion opening formed by the outer disk portion edge, the central disk portion opening sized and configured to receive and accommodate the groover body;
- a sloped or angled outer disk portion surface extending from the outer disk portion edge to the inner disk portion edge;
- a straight disk portion joining line joining the inner disk portion edge of each corresponding one of the pair of complementary disk portions to the inner disk portion edge of the other of each corresponding one of the pair of complementary disk portions in each corresponding one of the plurality of spaced-apart groover disks; and
- a tapered outer disk edge formed by the outer disk portion surface at the straight disk portion joining line.

2. The portable roller groover assembly of claim 1 wherein the groover body is cylindrical.

* * * * *